(12) United States Patent
Fujii et al.

(10) Patent No.: US 7,422,414 B2
(45) Date of Patent: Sep. 9, 2008

(54) INLET GUIDE VANE CONTROL DEVICE OF GAS TURBINE

(75) Inventors: Kentaro Fujii, Takasago (JP); Kozo Toyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 388 days.

(21) Appl. No.: 11/360,022

(22) Filed: Feb. 23, 2006

(65) Prior Publication Data

US 2007/0031238 A1    Feb. 8, 2007

(30) Foreign Application Priority Data

Aug. 3, 2005    (JP) .............................. 2005-224948

(51) Int. Cl.
*F04D 15/00*    (2006.01)

(52) U.S. Cl. ............................................. 415/1; 415/48

(58) Field of Classification Search ...................... 415/1, 415/17, 23, 29, 48; 60/39.27, 39.281, 773
See application file for complete search history.

(56) References Cited

U.S. PATENT DOCUMENTS 7,155,897 B2 *   1/2007   Nakamura et al. ......... 60/39.24
7,191,588 B2 *   3/2007   Tanaka et al. .............. 60/39.27
7,234,305 B2 *   6/2007   Nomura et al. ................ 60/773

FOREIGN PATENT DOCUMENTS

JP        10-47079         2/1998
JP        2000-045791      2/2000
JP        2003-206749      7/2003

OTHER PUBLICATIONS

Chinese Office Action dated Nov. 16, 2007, Application No. 200610006773.6.

\* cited by examiner

*Primary Examiner*—Igor Kershteyn
(74) *Attorney, Agent, or Firm*—Westerman, Hattori, Daniels & Adrian, LLP.

(57) ABSTRACT

An IGV opening command is set based on an IGV opening A set by an exhaust gas temperature control section, an IGV opening B set by a compressor surge protective control section, and an IGV opening C set by an exhaust gas pressure protective control section. The value of the IGV opening A, or the value of the IGV opening B, whichever is higher, is selected, the higher selected value, or the value of the IGV opening C, whichever is lower, is selected, and the lower selected value is set as the IGV opening command (gas turbine back pressure rise avoidance priority mode). Alternatively, the value of the IGV opening A, or the value of the IGV opening C, whichever is lower, is selected, the lower selected value, or the value of the IGV opening B, whichever is higher, is selected, and the higher selected value is set as the IGV opening command (compressor surge avoidance priority mode). Alternatively, a switcher switches between these modes.

4 Claims, 10 Drawing Sheets

INLET GUIDE VANE CONTROL DEVICE OF GAS TURBINE

BACKGROUND OF THE INVENTION

1. Field of the Invention

This invention relates to an inlet guide vane control device of a gas turbine comprising a gas turbine body, a combustor, and a compressor with an inlet guide vane.

2. Description of the Related Art

A gas turbine, which comprises a gas turbine body, a combustor, and a compressor with an inlet guide vane (IGV), is equipped with various control devices and protective devices, such as an IGV control device for exercising opening control of IGV, and a fuel control device for controlling the amount of fuel supply to the combustor.

A conventional IGV control device determined an IGV opening command based on a gas turbine output corrected with the intake air temperature of the compressor (the temperature of the air flowing into the compressor) (corrected gas turbine output: the product of a correction factor, set as a function of the intake air temperature, and gas turbine output), and effected the opening control of IGV according to this command. The reason why the gas turbine output is corrected with the intake air temperature is that the IGV opening command is determined in consideration of the density of air differing according to whether the intake air temperature is high or low.

Patent document 1 indicated below describes an antisurge control device of a gas turbine. Patent document 2 shown below describes gas turbine equipment provided with a control device for performing IGV opening control such that the exhaust gas temperature becomes a predetermined temperature.

Patent document 1: Japanese Patent Application Laid-Open No. 1998-47079

Patent document 2: Japanese Patent Application Laid-Open No. 2003-206749

The above-described conventional IGV control device only determines the IGV opening from the gas turbine output corrected with the intake air temperature, and does not effect the following types of control:

(1) IGV opening control such that the temperature of the exhaust gas discharged from the gas turbine body does not reach the exhaust gas temperature limit.
(2) IGV opening control such that the pressure ratio of the compressor (the ratio between the inlet pressure and the outlet pressure) does not reach the surge limit of the compressor.
(3) IGV opening control such that the pressure of the exhaust gas (combustion gas) discharged from the gas turbine body (i.e., gas turbine back pressure) does not reach the gas turbine back pressure limit value.

If the exhaust gas temperature or the exhaust gas pressure (gas turbine back pressure) become too high, damage to or breakage of an exhaust duct may be induced. If the pressure ratio becomes too high, surging may occur, causing damage to or breakage of the compressor. Thus, with the IGV control device, it is also necessary to exercise IGV opening control in consideration of the exhaust gas temperature, the pressure ratio of the compressor, and the exhaust gas pressure. In the protective device of the gas turbine, when the exhaust gas pressure reaches a predetermined value, for example, the gas turbine is brought to an emergency stop and, when the pressure ratio or the exhaust gas temperature reaches a predetermined value, a certain protective function is performed. In order to ensure the continued operation of the gas turbine (increased rate of operation) while reducing the possibility that the protective function, such as emergency shutdown, is performed, there is need to perform IGV opening control in the IGV control device, with the exhaust gas temperature, the pressure ratio of the compressor, and the exhaust gas pressure being taken into consideration.

The antisurge control of patent document 1 and the exhaust gas temperature control of patent document 2 mentioned above are each performed individually, and do not correspond to IGV opening control taking the exhaust gas temperature, the pressure ratio of the compressor, and the exhaust gas pressure into consideration.

The present invention has been accomplished in light of the above-described circumstances. It is an object of the invention to provide an inlet guide vane (IGV) control device which can exercise IGV opening control taking the exhaust gas temperature, the pressure ratio of the compressor, and the exhaust gas pressure into consideration.

SUMMARY OF THE INVENTION

A first aspect of the present invention, for attaining the above object, is an inlet guide vane control device of a gas turbine, which is installed in the gas turbine including a gas turbine body, a combustor, and a compressor with an inlet guide vane, and which exercises opening control of the inlet guide vane, wherein an inlet guide vane opening command is set based on a first inlet guide vane opening set by first inlet guide vane opening setting means such that a temperature of an exhaust gas discharged from the gas turbine body does not exceed a limit value, a second inlet guide vane opening set by second inlet guide vane opening setting means such that a pressure ratio of the compressor does not exceed a surge pressure ratio of the compressor, and a third inlet guide vane opening set by third inlet guide vane opening setting means such that a pressure of the exhaust gas discharged from the gas turbine body does not exceed a limit value.

In a second aspect of the present invention, a value of the first inlet guide vane opening or a value of the second inlet guide vane opening, whichever is higher, maybe selected, the selected higher value or a value of the third inlet guide vane opening, whichever is lower, may be selected, and the selected lower value maybe set as the inlet guide vane opening command.

In a third aspect of the present invention, a value of the first inlet guide vane opening or a value of the third inlet guide vane opening, whichever is lower, maybe selected, the selected lower value or a value of the second inlet guide vane opening, whichever is higher, may be selected, and the selected higher value may be set as the inlet guide vane opening command.

In a fourth aspect of the present invention, the inlet guide vane control device of a gas turbine may further comprise mode switching means for switching between a gas turbine back pressure rise avoidance priority mode in which a value of the first inlet guide vane opening or a value of the second inlet guide vane opening, whichever is higher, is selected, the selected higher value or a value of the third inlet guide vane opening, whichever is lower, is selected, and the selected lower value is set as the inlet guide vane opening command; and a compressor surge avoidance priority mode in which a value of the first inlet guide vane opening or a value of the third inlet guide vane opening, whichever is lower, is selected, the selected lower value or a value of the second inlet guide vane opening, whichever is higher, is selected, and the selected higher value is set as the inlet guide vane opening command.

According to the inlet guide vane control device of a gas turbine, as the first aspect of the present invention, the inlet guide vane opening command is set based on the first inlet guide vane opening set by the first inlet guide vane opening setting means such that the temperature of the exhaust gas discharged from the gas turbine body does not exceed the limit value, the second inlet guide vane opening set by the second inlet guide vane opening setting means such that the pressure ratio of the compressor does not exceed the surge pressure ratio of the compressor, and the third inlet guide vane opening set by the third inlet guide vane opening setting means such that the pressure of the exhaust gas discharged from the gas turbine body does not exceed the limit value. Thus, inlet guide vane opening control can be effected, with the exhaust gas temperature, the pressure ratio of the compressor, and the exhaust gas pressure being taken into consideration. Thus, the continued operation of the gas turbine (increased rate of operation) can be ensured, with the possibility being diminished that the protective function, such as emergency shutdown, is performed.

According to the inlet guide vane control device of a gas turbine, as the second aspect of the present invention, the value of the first inlet guide vane opening or the value of the second inlet guide vane opening, whichever is higher, is selected, the selected higher value or the value of the third inlet guide vane opening, whichever is lower, is selected, and the selected lower value is set as the inlet guide vane opening command. By so doing, inlet guide vane opening control with priority placed on the avoidance of a gas turbine back pressure rise can be effected. Hence, the emergency shutdown of the gas turbine due to an exhaust gas pressure rise (gas turbine back pressure rise) can be prevented more reliably to ensure the continued operation of the gas turbine (increased rate of operation).

According to the inlet guide vane control device of a gas turbine, as the third aspect of the present invention, the value of the first inlet guide vane opening or the value of the third inlet guide vane opening, whichever is lower, is selected, the selected lower value or the value of the second inlet guide vane opening, whichever is higher, is selected, and the selected higher value is set as the inlet guide vane opening command. By so doing, inlet guide vane opening control with priority placed on the avoidance of compressor surge can be effected. Hence, compressor surge can be avoided more reliably.

According to the inlet guide vane control device of a gas turbine, as the fourth aspect of the present invention, there is also provided mode switching means for switching between a gas turbine back pressure rise avoidance priority mode in which the value of the first inlet guide vane opening or the value of the second inlet guide vane opening, whichever is higher, is selected, the selected higher value or the value of the third inlet guide vane opening, whichever is lower, is selected, and the selected lower value is set as the inlet guide vane opening command; and a compressor surge avoidance priority mode in which the value of the first inlet guide vane opening or the value of the third inlet guide vane opening, whichever is lower, is selected, the selected lower value or the value of the second inlet guide vane opening, whichever is higher, is selected, and the selected higher value is set as the inlet guide vane opening command. Thus, inlet guide vane opening control placing priority on gas turbine back pressure rise avoidance, or inlet guide vane opening control placing priority on compressor surge avoidance can be arbitrarily selected according to the operating status of the gas turbine.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Embodiments of the present invention will be described in detail with reference to the accompanying drawings.

Embodiment 1

Figure 1:
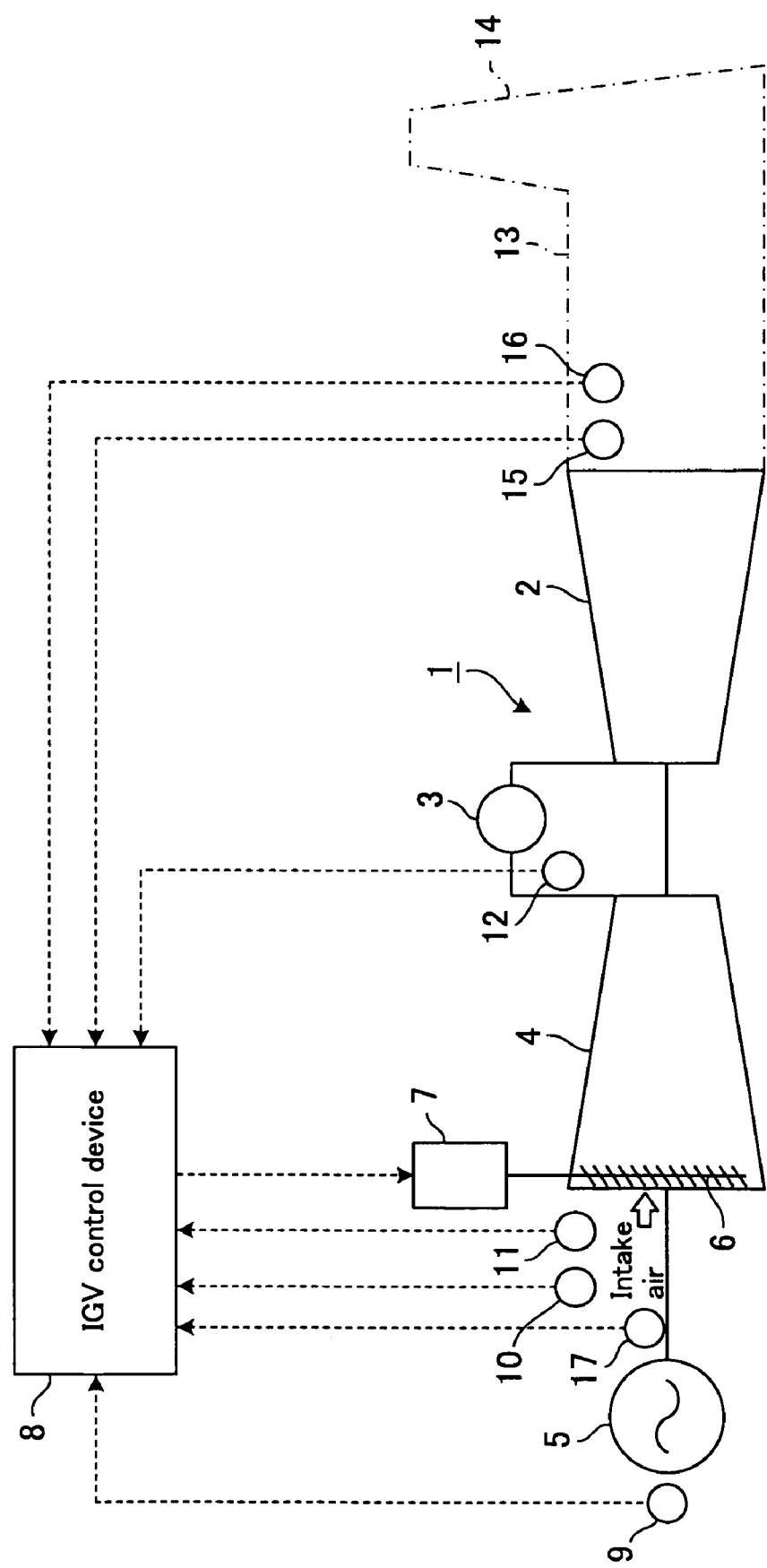
FIG. 1 is an outline view of an IGV control device of a gas turbine according to Embodiment 1 of the present invention, and the gas turbine.
Figure 2:
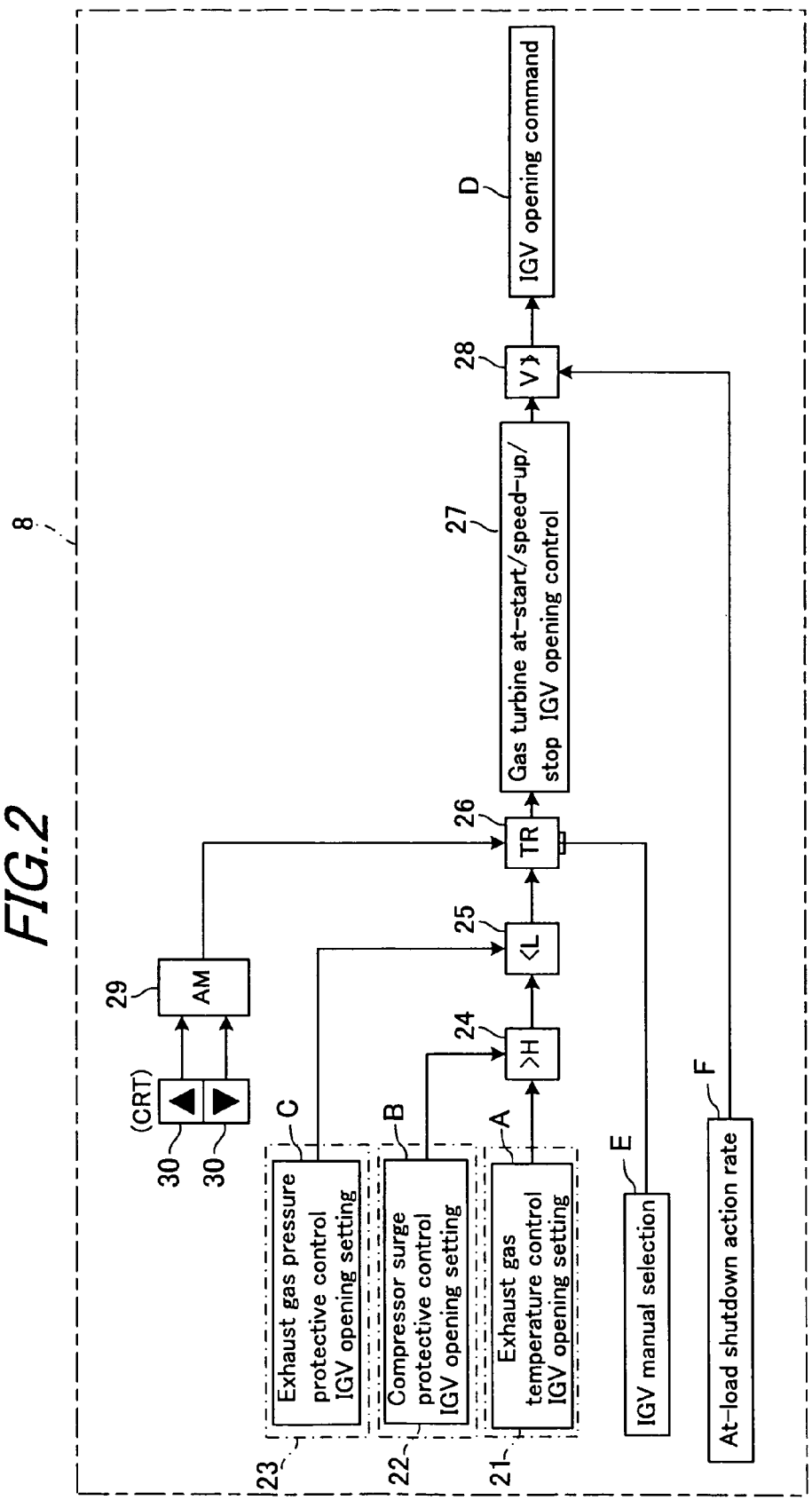
FIG. 2 is a block diagram showing the entire configuration of the above IGV control device.
Figure 3:
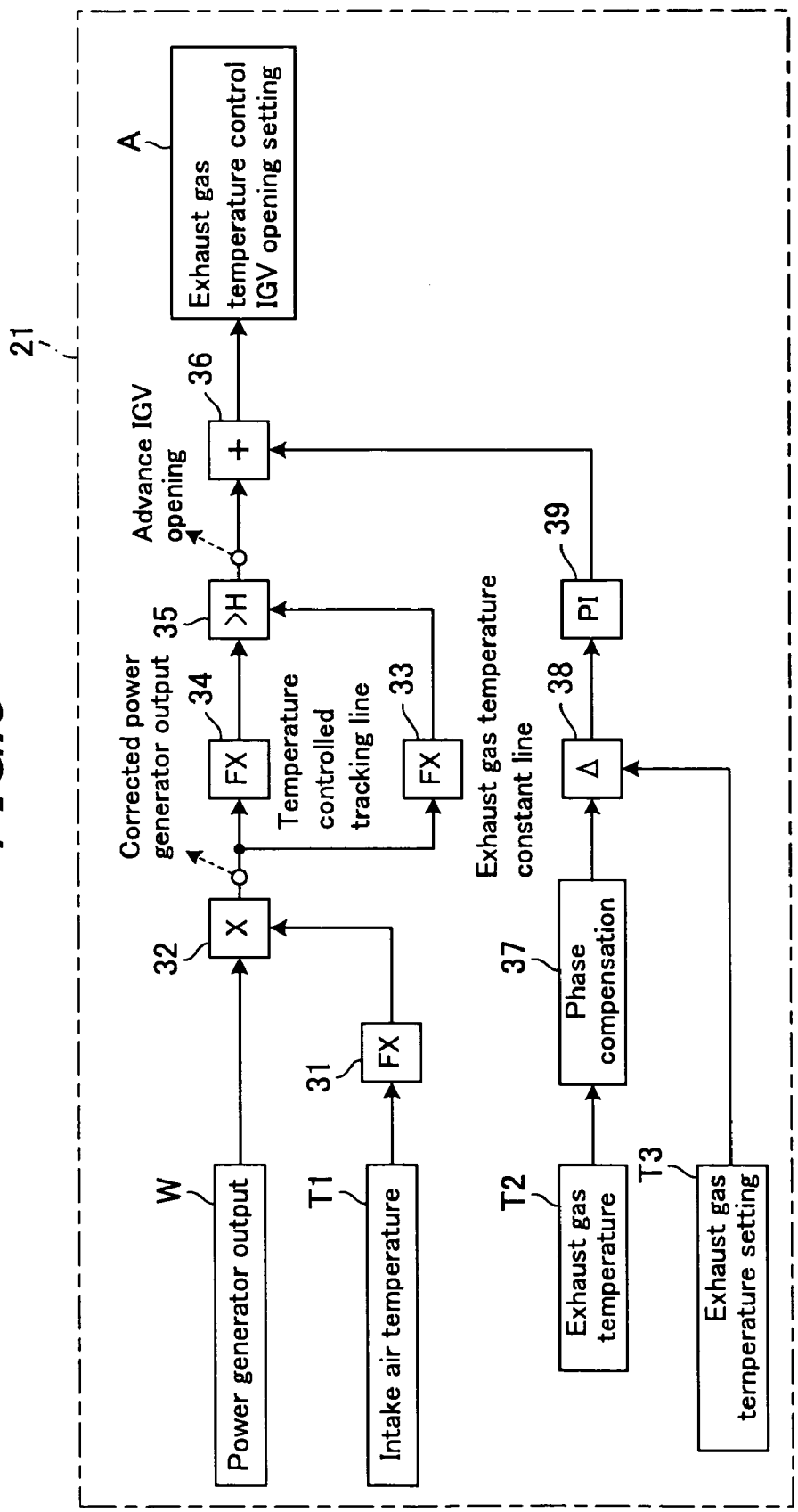
FIG. 3 is a block diagram showing the configuration of an exhaust gas temperature control section in the above IGV control device.
Figure 4:
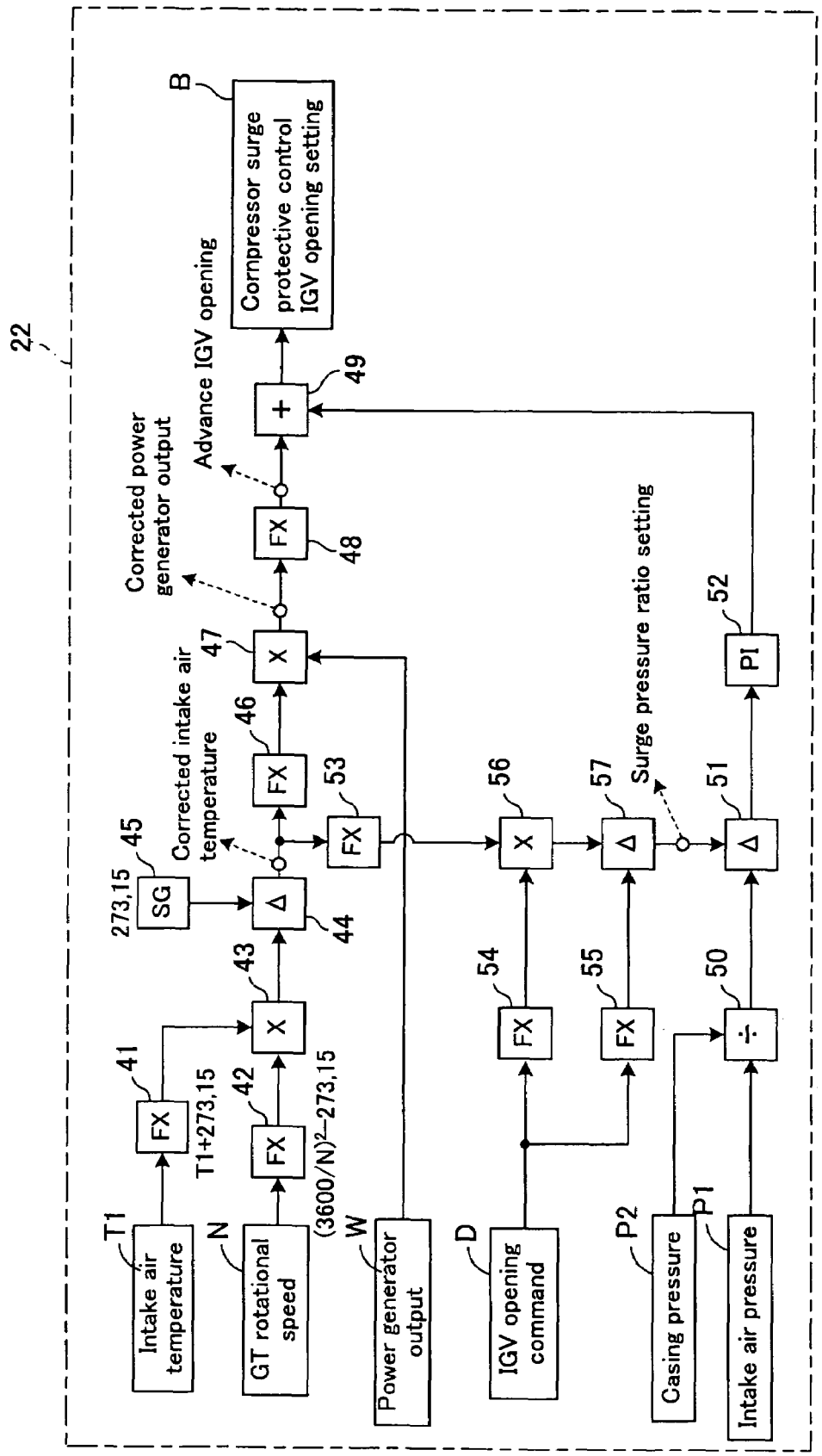
FIG. 4 is a block diagram showing the configuration of a compressor surge protective control section in the above IGV control device.
Figure 5:
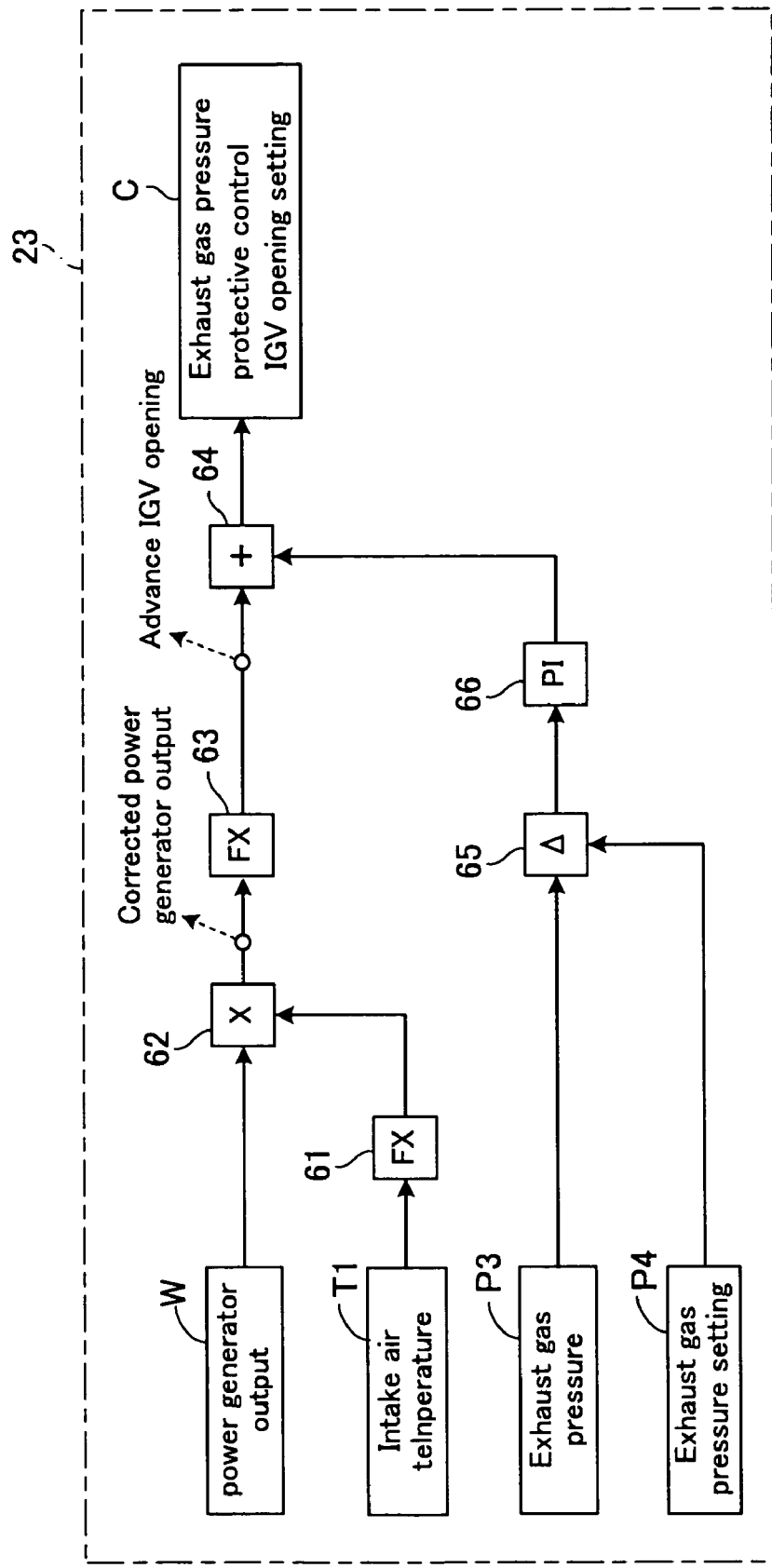
FIG. 5 is a block diagram showing the configuration of an exhaust gas pressure protective control section in the above IGV control device.

FIG. 1 is an outline view of an IGV control device of a gas turbine according to Embodiment 1 of the present invention, and the gas turbine. FIG. 2 is a block diagram showing the entire configuration of the above IGV control device. FIG. 3 is a block diagram showing the configuration of an exhaust gas temperature control section in the above IGV control device. FIG. 4 is a block diagram showing the configuration of a compressor surge protective control section in the above IGV control device. FIG. 5 is a block diagram showing the configuration of an exhaust gas pressure protective control section in the above IGV control device.

Figure 6:
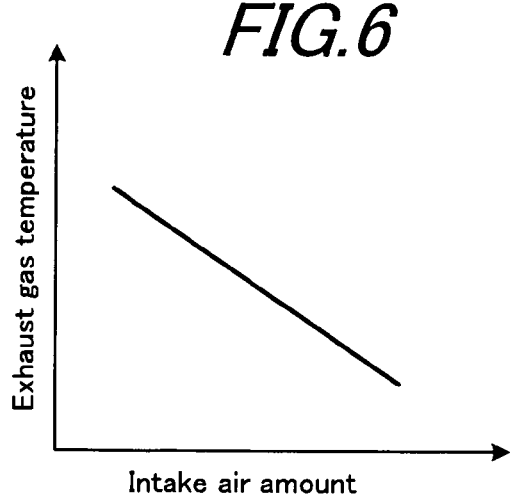
FIG. 6 is a view showing the relationship between the intake air amount of a compressor and the exhaust gas temperature.
Figure 7:
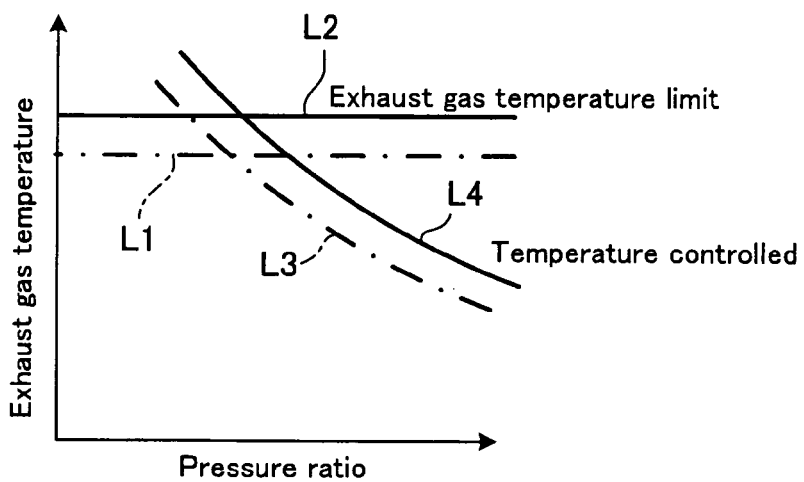
FIG. 7 is a view showing the relationship between the pressure ratio of the compressor and the exhaust gas temperature.
Figure 8:
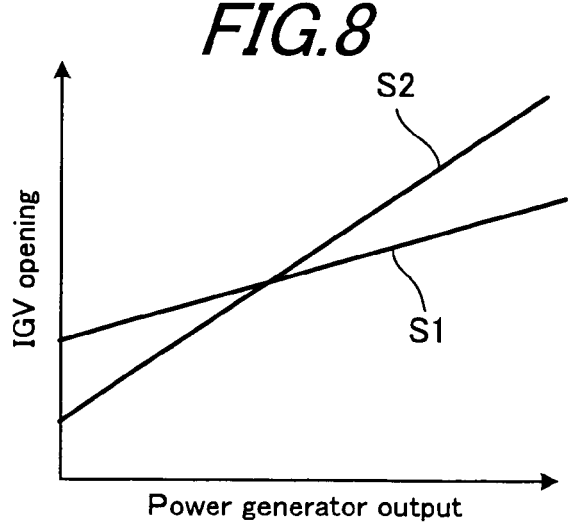
FIG. 8 is a view showing examples of an IGV opening schedule concerned with exhaust gas temperature control.
Figure 9:
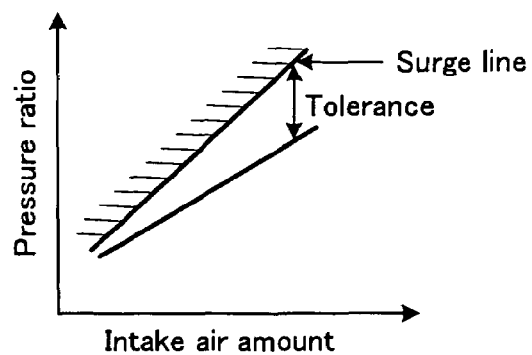
FIG. 9 is a view showing the relationship between the intake air amount of the compressor and the pressure ratio.
Figure 10:
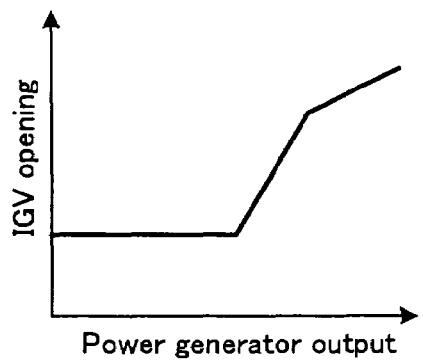
FIG. 10 is a view showing an example of an IGV opening schedule concerned with compressor surge control.
Figure 11:
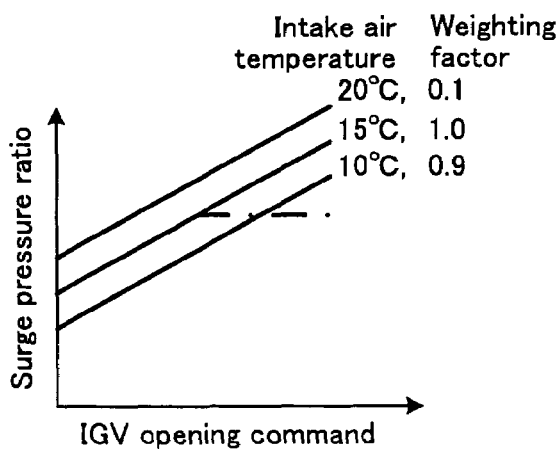
FIG. 11 is a view showing the relationship between an IGV opening command and the surge pressure ratio.
Figure 12:
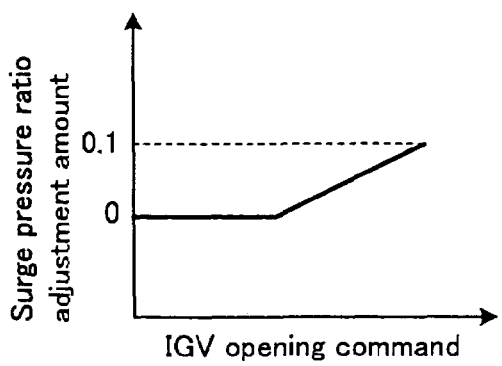
FIG. 12 is a view showing the relationship between the IGV opening command and the surge pressure ratio adjustment amount.
Figure 13:
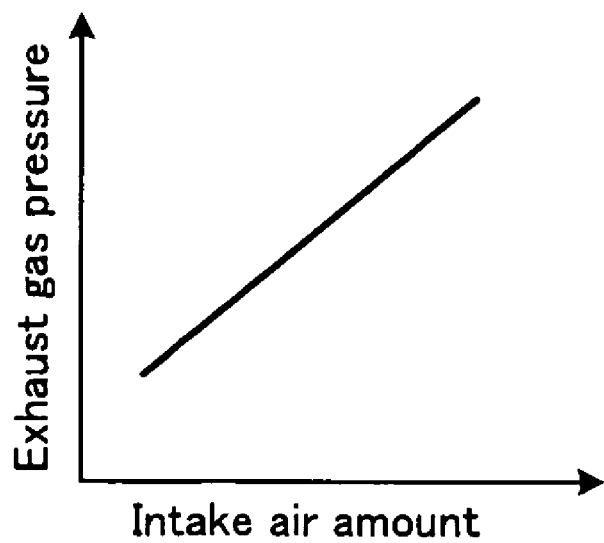
FIG. 13 is a view showing the relationship between the intake air amount of the compressor and the exhaust gas pressure.
Figure 14:
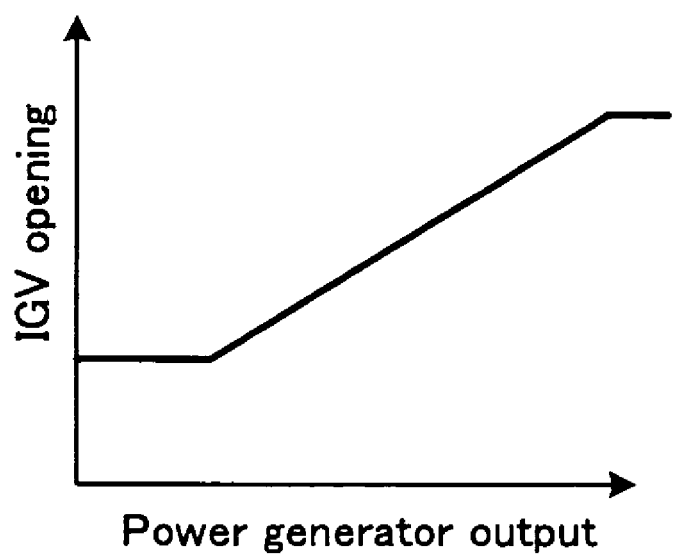
FIG. 14 is a view showing an example of an IGV opening schedule concerned with exhaust gas pressure control.

FIG. 6 is a view showing the relationship between the intake air amount of a compressor and the exhaust gas temperature. FIG. 7 is a view showing the relationship between the pressure ratio of the compressor and the exhaust gas temperature. FIG. 8 is a view showing examples of an IGV opening schedule concerned with exhaust gas temperature control. FIG. 9 is a view showing the relationship between the intake air amount of the compressor and the pressure ratio. FIG. 10 is a view showing an example of an IGV opening schedule concerned with compressor surge control. FIG. 11 is a view showing the relationship between an IGV opening command and the surge pressure ratio. FIG. 12 is a view showing the relationship between the IGV opening command and the surge pressure ratio adjustment amount. FIG. 13 is a view showing the relationship between the intake air amount of the compressor and the exhaust gas pressure. FIG. 14 is a view showing an example of an IGV opening schedule concerned with exhaust gas pressure control.

As shown in FIG. 1, a gas turbine 1 comprises a gas turbine body 2, a combustor 3, and a compressor 4 having a rotating shaft coupled to the rotating shaft of the gas turbine body 2. This gas turbine 1 is provided with a power generator 5 to constitute gas turbine power generation equipment. The rotating shaft of the power generator 5 is also coupled to the rotating shaft of the gas turbine body 2.

Thus, when a fuel is burned in the combustor 3 together with high pressure intake air compressed by the compressor 4, and the gas turbine body 2 is rotated by the resulting combustion gas, the power generator 5 is rotationally driven by the gas turbine body 2 to generate power. The generated power of the power generator 5 is transmitted via a power transmission system (not shown). The combustion gas (exhaust gas), which did work in the gas turbine body 2 and was discharged from the gas turbine body 2, is released into the atmosphere from a stack 14 via an exhaust duct 13. Before the exhaust gas is released from the stack 14, its exhaust heat may be recovered by a heat exchanger or the like.

During the operation of the gas turbine, the intake air amount of the compressor 4 is adjusted by the opening or closing of an inlet guide vane (IGV) 6 provided at the inlet of the compressor 4. Driving for the opening or closing of the IGV 6 is performed by an actuator 7, such as a servomotor, provided for the IGV 6. The opening control of the IGV 6 (driving control over the actuator 7) is effected by an IGV control device 8. A concrete configuration for these features will be described later, and detection signals outputted from various detectors provided in the gas turbine power generation equipment are inputted into the IGV control device 8.

The wattmeter 9 is provided in the power transmission system of the power generator 5. An intake air temperature detector 10 and an intake air pressure detector 11 are provided on the inlet side of the compressor 4, while a casing pressure detector 12 is provided on the outlet side of the compressor 4. An exhaust gas temperature detector 15 and an exhaust gas pressure detector 16 are provided on the outlet side of the gas turbine body 2. A gas turbine rotational speed detector 17 is provided on a rotating shaft portion of the gas turbine 1.

A wattmeter 9 detects the generated power of the power generator 5, and outputs its detection signal to the IGV control device 8. The intake air temperature detector 10 detects the temperature of intake air on the inlet side of the compressor 4 (i.e., the air flowing into the compressor 4), and outputs a detection signal on the intake air temperature to the IGV control device 8. The intake air pressure detector 11 detects the pressure of intake air on the inlet side of the compressor 4 (i.e., the air flowing into the compressor 4), and outputs a detection signal on the intake air pressure to the IGV control device 8. The casing pressure detector 12 detects casing pressure, which is the intake air pressure on the outlet side of the compressor 4 (i.e., the pressure of the intake air discharged from the compressor 4), and outputs a detection signal on this casing pressure to the IGV control device 8. The exhaust gas temperature detector 15 detects the temperature of the exhaust gas discharged from the gas turbine body 2, and outputs a detection signal on the exhaust gas temperature to the IGV control device 8. The exhaust gas pressure detector 16 detects the pressure of the exhaust gas discharged from the gas turbine body 2 (i.e., gas turbine back pressure), and outputs a detection signal on the exhaust gas pressure to the IGV control device 8. The gas turbine rotational speed detector 17 detects the rotational speed of the gas turbine 1, and outputs a detection signal on the gas turbine rotational speed to the IGV control device 8.

The gas turbine power generation equipment is furnished not only with the IGV control device 8, but also with a fuel control device for controlling the amount of fuel supply to the combustor 3, and protective devices for performing various protective actions, such as issuing an alarm, for example, when the exhaust gas pressure, the pressure ratio of the compressor, or the exhaust gas temperature has become abnormally high, or bringing the gas turbine 1 to an emergency stop. Their explanations are omitted herein.

The concrete configuration of the IGV control device 8 will be described. With reference to FIG. 2, the overall configuration of the IGV control device 8 is described first of all. The functions of the IGV control device are constituted by software, and run by a computer, but this is not limitative, and they may be constituted by hardware.

As shown in FIG. 2, the IGV control device 8 of the present Embodiment 1 has an exhaust gas temperature control section 21 as a first inlet guide vane opening setting means, a compressor surge protective control section 22 as a second inlet guide vane opening setting means, and an exhaust gas pressure protective control section 23 as a third inlet guide vane opening setting means.

In the IGV control device 8, an inlet guide vane opening command D is set based on an IGV opening A as a first inlet guide vane opening set by the exhaust gas temperature control section 21 such that the temperature of the exhaust gas discharged from the gas turbine body 2 does not exceed a limit value, an IGV opening B as a second inlet guide vane opening set by the compressor surge protective control section 22 such that the pressure ratio of the compressor 4 (the ratio between the inlet pressure and the outlet pressure of the compressor 4) does not exceed the surge pressure ratio of the compressor 4 (i.e., surge limit line or surge line), and an IGV opening C as a third inlet guide vane opening set by the exhaust gas pressure protective control section 23 such that the pressure of the exhaust gas discharged from the gas turbine body 2 does not exceed a limit value. Under this inlet guide vane opening command D, the opening control of the IGV 6 (driving control of the actuator 7) is performed.

Concretely, the value of the IGV opening A set by the exhaust gas temperature control section 21, or the value of the second inlet guide vane opening B set by the compressor surge protective control section 22, whichever is higher (i.e., the greater opening), is selected in a higher value selector 24. Then, the higher selected value in the higher value selector 24 (i.e., the IGV opening A or the IGV opening B), or the value of the IGV opening C set by the exhaust gas pressure protective control section 23, whichever is lower (i.e., the smaller opening), is selected in a lower value selector 25. This lower selected value in the lower value selector 25 (the IGV opening A, the IGV opening B, or the IGV opening C) is taken as the inlet guide vane opening command D. That is, the IGV control device 8 is in a "gas turbine back pressure rise avoidance priority mode" in which top priority is placed on the IGV opening C for exhaust gas pressure protective control.

In the illustrated control circuit, a switcher 26, a gas turbine at-start/speed-up/stop IGV opening control section 27, and a rate setter 28 are provided in this sequence after the lower value selector 25 for the purpose of an IGV manual operation (manual setting of an IGV opening command) or the setting of an IGV opening command at the time of load shutdown.

The switcher 26 normally adopts and outputs the lower selected value of the lower value selector 25 for automatic control of the IGV 6. When an IGV manual selection signal E is entered from an IGV manual selector (not shown), the switcher 26 selects and outputs an output of an analog memory 29 in order to switch to a manual operation. That is, at the time of the manual operation, the output of the analog memory 29 (the IGV opening set manually) is taken as the IGV opening command D. The output of the analog memory 29 is increased or decreased by an operator operating an IGV opening increasing/decreasing button 30 displayed on CRT.

At the time of start, speed-up or stop of the gas turbine body 2 (namely, when the rotational speed of the gas turbine body 2 is not a rated rotational speed), the power generator 5 does not generate power, and gas turbine output (generator output) is not obtained. Thus, the IGV opening cannot be set based on the power generator output. At this time, therefore, regardless of the control by the exhaust gas temperature control section 21, the compressor surge protective control section 22, and the exhaust gas pressure protective control section 23, the IGV opening is set in the gas turbine at-start/speed-up/stop IGV opening control section 27 (its detailed configuration is omitted), and taken as the IGV opening command D.

The rate setter 28 does not output its input value, unchanged, as the IGV opening command D, but limits an increase or decrease in the input value to a predetermined rate (increase rate or decrease rate) and outputs it, in order that the IGV 6 does not frequently repeat an opening or closing action according to ordinary minute changes in the power generator output. Upon receipt of an at-load shutdown action rate F outputted from a protective device (not shown) during load shutdown of the power generator 5, the rate setter 28 takes, as the IGV opening command D, an IGV opening at a higher rate set based on the at-load shutdown action rate F, thereby raising the speed at which the IGV 6 is closed.

Next, the concrete configurations of the exhaust gas temperature control section 21, the compressor surge protective control section 22, and the exhaust gas pressure protective control section 23 of the IGV control device 8 will be described based on FIGS. 3 to 13.

The exhaust gas temperature control section 21 is described first of all. Upon preliminary study, an opening schedule of the IGV 6, according to which an operation is expected to be performed such that the exhaust gas temperature becomes as close as possible to the exhaust gas temperature limit, is formed based on the heat balance of the gas turbine 1. In the exhaust gas temperature control section 21, an advance IGV opening is set based on this IGV opening schedule and, if the exhaust gas temperature during operation is expected to exceed the limit value, the advance IGV opening is automatically subjected to feedback correction to open the IGV 6 (increase the opening). As illustrated in FIG. 6, the gas turbine has the characteristics that when the amount of intake air increases, the exhaust gas temperature lowers. Thus, when the exhaust gas temperature is to be lowered, it is recommendable to increase the amount of intake air by rendering the opening of the IGV 6 greater.

In detail, as shown in FIG. 3, a function generator 31 sets a correction factor as a function of a compressor inlet intake air temperature T1 entered from the intake air temperature detector 10. In a multiplier 32, power generator output (gas turbine output) W entered from the wattmeter 9 is multiplied by the correction factor set by the function generator 31 to obtain an intake air temperature-corrected power generator output. The reason why the power generator output is corrected with the intake air temperature is that the IGV opening is determined in consideration of the density of air differing according to whether the intake air temperature is high or low. In the function generator 31, the function is set, for example, such that the correction factor is 1.0 when the intake air temperature is 15° C., 0.9 when the intake air temperature is 10° C., and 1.1 when the intake air temperature is 20° C.

Setting of the advance IGV opening is made by preparing two lines, i.e., an exhaust gas temperature constant line L1 (a line along an exhaust gas temperature limit line L2) for limiting the exhaust gas temperature, for example, to 600° C., and a temperature controlled tracking line L3 (a line along an inlet combustion gas temperature limit line L4) for limiting the combustion gas temperature at the inlet of the gas turbine body 2, for example, to 1,500° C., as shown in FIG. 7, and selecting one of the lines which represents a higher value.

That is, in a function generator 33, there has been set a function representing the aforementioned opening schedule of the IGV 6 concerned with exhaust gas temperature control, namely, a function representing the IGV opening schedule which maintains the exhaust gas temperature constant line L1 preset from the gas turbine heat balance by preliminary study, and according to which an operation is performed such that the exhaust gas temperature becomes as close as possible to the exhaust gas temperature limit (for example, a function representing an IGV opening schedule S1 as illustrated in FIG. 8). Based on this function representing the IGV opening schedule, the opening of the IGV 6, which corresponds to the intake air temperature-corrected power generator output obtained in the multiplier 32, is set. A function generator 34 sets a function representing the IGV opening schedule which maintains the temperature controlled tracking line L3 preset from the gas turbine heat balance by preliminary study (for example, a function representing an IGV opening schedule S2 as illustrated in FIG. 8). Based on this function representing the IGV opening schedule, there is set the opening of the IGV 6, which corresponds to the intake air temperature-corrected power generator output obtained in the multiplier 32.

A higher value selector 35 selects the value of the IGV opening obtained in the function generator 33, or the value of the IGV opening obtained in the function generator 34, whichever is higher, and sets the selected higher value as an advance IGV opening. Then, unless feedback correction is made in an adder 36, the advance IGV opening set in the higher value selector 35 is outputted to the higher value selector 24 (FIG. 2) as the IGV opening A for exhaust gas temperature control.

If an exhaust gas temperature T2 is sent, as feedback, from the exhaust gas temperature detector 15, a subtracter (deviation computing unit) 38 computes a temperature deviation (T2-T3) between the outcome of phase lead compensation for the exhaust gas temperature T2 by a phase compensator 37 (not necessarily limited to making phase compensation) and an exhaust gas temperature setting (e.g., 600° C.) T3 set by an exhaust gas temperature setter (not shown).

If, as a result, the exhaust gas temperature T2 exceeds the exhaust gas temperature setting T3, and the temperature deviation is positive, proportional plus integral computation based on this temperature deviation is performed by a PI (proportion plus integral) controller 39 to obtain a correction value for the advance IGV opening. At this time, the adder 36 adds the correction value to the advance IGV opening outputted from the higher value selector 35 to make feedback correction of the advance IGV opening setting. This corrected advance IGV opening is outputted to the higher value selector 24 (FIG. 2) as the IGV opening A for exhaust gas temperature control. The feedback correction amount for the advance IGV opening in this exhaust gas temperature control is to be in a correction range only on the positive side (e.g., +0 to 20%) (namely, only on the side where the opening of the IGV 6 is increased), and no feedback correction is to be made on the side where the opening of the IGV 6 is rendered smaller than the advance IGV opening.

Next, the compressor surge protective control section 22 will be described. Upon preliminary study, an opening schedule of the IGV 6, according to which an operation is expected to be performed such that the pressure ratio of the compressor 4 becomes as close as possible to the surge line, is formed based on the heat balance of the gas turbine 1. In the compressor surge protective control section 22 shown in FIG. 4, an advance IGV opening is set based on this IGV opening schedule and, if the pressure ratio of the compressor 4 during operation is expected to exceed the limit value, the advance IGV opening is automatically subjected to feedback correction to open the IGV 6 (increase the opening) As illustrated in FIG. 9, the compressor has the characteristics that when the amount of intake air increases, the pressure ratio of the compressor 4 also increases, but tolerance to the surge line increases. Thus, when the tolerance of the pressure ratio to the surge line is to be increased, it is recommendable to increase the amount of intake air by rendering the opening of the IGV 6 greater.

In detail, as shown in FIG. 4, a computation of the equation indicated below is carried out in function generators 41, 42, a multiplier 43, a subtracter 44, and a signal generator 45 based on the compressor inlet intake air temperature T1 entered from the intake air temperature detector 10, and a gas turbine rotational speed N inputted from the gas turbine rotational speed detector 17, whereby the intake air temperature T1 is corrected with the gas turbine rotational speed N to obtain a corrected intake air temperature. In this equation, the number 3,600 (RPM) refers to the gas turbine rotational speed when the power generation frequency is 60 Hz, while the gas turbine rotational speed is 3,000 (RPM) when the power generation frequency is 50 Hz.

$$\text{Corrected intake air temperature} = (\text{intake air temperature } T1 + 273.15) \times (3600/\text{gas turbine rotational speed } N)^2 - 273.15$$

Then, a function generator 46 sets a correction factor as a function of the corrected intake air temperature. In a multiplier 47, power generator output (gas turbine output) W entered from the wattmeter 9 is multiplied by the correction factor set by the function generator 46 to obtain an intake air temperature-corrected power generator output. The reason why the power generator output is corrected with the intake air temperature is that the IGV opening is determined in consideration of the density of air differing according to whether the intake air temperature is high or low.

In a function generator 48, there has been set a function representing the aforementioned opening schedule of the IGV 6 concerned with compressor surge protective control (for example, a function representing an IGV opening schedule as illustrated in FIG. 10). Based on this function representing the IGV opening schedule, the opening of the IGV 6, which corresponds to the intake air temperature-corrected power generator output obtained in the multiplier 47, is determined, and set as an advance IGV opening. That is, a computation of the following equation is performed to obtain the advance IGV opening:

$$\text{Advance IGV opening} = FX(\text{power generator output}) \times FX(\text{corrected intake air temperature})$$

Then, unless feedback correction is made in an adder 49, the advance IGV opening set in the function generator 48 is outputted to the higher value selector 24 as the IGV opening B for compressor surge protective control.

If an intake air pressure (compressor inlet pressure) P1 is provided, as feedback, from the intake air pressure detector 11, and a casing pressure (compressor outlet pressure) P2 is provided, as feedback, from the casing pressure detector 12, a divider 50 obtains the ratio between the intake air pressure P1 and the casing pressure P2 (P2/P1) as the pressure ratio PR1 of the compressor 4. A subtracter (deviation computing unit) 51 computes a pressure ratio deviation (PR1-PR2) between the pressure ratio PR1 of the compressor 4 and a surge pressure ratio setting PR2 for antisurging.

If, as a result, the pressure ratio PR1 of the compressor 4 exceeds the surge pressure ratio setting PR2 to render the pressure ratio deviation positive, proportional plus integral computation based on this pressure ratio deviation is performed by a PI (proportion plus integral) controller 52 to obtain a correction value for the advance IGV opening. At this time, the adder 49 adds the correction value to the advance IGV opening outputted from the function generator 48 to make feedback correction of the advance IGV opening setting. This corrected advance IGV opening is outputted to the higher value selector 24 (FIG. 2) as the IGV opening B for compressor surge protective control. The feedback correction amount for the advance IGV opening in this compressor surge protective control is to be in a correction range only on the positive side (e.g., +0 to 20%) (namely, only on the side where the opening of the IGV 6 is increased), and no feedback correction is to be made on the side where the opening of the IGV 6 is rendered smaller than the advance IGV opening.

The surge pressure ratio setting PR2 is made based on the IGV opening command D. That is, in the example of FIG. 4, a computation of the equation indicated below is performed in function generators 53, 54, 55, a multiplier 56, and a subtracter 57 based on the IGV opening command D outputted from the IGV control device 8, and the corrected intake air temperature outputted from the subtracter 44 to obtain the surge pressure ratio setting PR2. The surge pressure ratio setting is a value with a moderate margin (e.g., 20% of the surge limit value) with respect to the surge line.

$$\text{Surge pressure ratio setting} = FX(IGV \text{ opening command}) - FX(IGV \text{ opening command}) \times FX(\text{corrected intake air temperature})$$

In the function generator 54, a function representing the relationship between the IGV opening command and the surge pressure ratio has been set, and a surge pressure ratio corresponding to the IGV opening command D is determined based on this function. In the function generator 53, a function representing the relationship between the intake air temperature and a weighting factor has been set, and a weighting factor corresponding to the corrected intake air temperature is determined based on this function. This weighting factor takes a small value in order to lower a surge pressure ratio setting when the intake air temperature is high as in the summer, while the weighting factor takes a high value in order to raise a surge pressure ratio setting when the intake air temperature is low as in the winter. In the multiplier 56, the surge pressure ratio determined in the function generator 54 is multiplied by the weighting factor determined in the function generator 53. As a result, a surge pressure ratio taking the intake air temperature into consideration is set. FIG. 11 shows examples of the surge pressure ratio corresponding to the IGV opening command when the weighting factors for the corrected intake air temperatures of 10° C., 15° C. and 20° C. are 0.9, 1.0 and 1.1, respectively.

In the illustrated embodiment, moreover, the function generator 55 is present for setting a correction function for fine adjustment. Thus, a fine adjustment amount for the surge pressure ratio suited to the IGV opening command D is obtained, so that a subtraction between the surge pressure ratio fine adjustment amount and the surge pressure ratio obtained in the multiplier 56 can be performed, and the difference can be set as the surge pressure ratio. For example, if the relationship (function) between the IGV opening command and the surge pressure ratio is not in the form of a simple straight line as indicated by solid lines in FIG. 11, but needs to be changed in slope halfway as indicated by a dashed dotted line in FIG. 11, a function of the IGV opening command and the surge pressure ratio adjustment amount as shown in FIG. 12 may be set in the function generator 55.

Next, the exhaust gas pressure protective control section 23 will be described. Upon preliminary study, an expected opening schedule of the IGV 6, according to which the exhaust gas pressure during operation becomes as close as possible to the gas turbine back pressure limit, is formed based on the intake air temperature. In the exhaust gas pressure protective control section 23 shown in FIG. 5, an advance IGV opening is set based on this IGV opening schedule and, if the exhaust gas pressure during operation is expected to exceed the limit value, the advance IGV opening is automatically subjected to feedback correction to close the IGV 6 (decrease the opening). As illustrated in FIG. 13, the gas turbine has the characteristics that when the amount of intake air increases, the exhaust gas pressure rises. Thus, when the exhaust gas pressure is to be decreased, it is recommendable to decrease the amount of intake air by rendering the opening of the IGV 6 smaller.

In detail, as shown in FIG. 5, a function generator 61 sets a correction factor as a function of the compressor inlet intake air temperature T1 inputted from the intake air temperature detector 10. In a multiplier 62, power generator output (gas turbine output) W entered from the wattmeter 9 is multiplied by the correction factor set by the function generator 61 to obtain an intake air temperature-corrected power generator output. The reason why the power generator output is corrected with the intake air temperature is that the IGV opening is determined in consideration of the density of air differing according to whether the intake air temperature is high or low.

A function representing the aforementioned opening schedule of the IGV 6 concerned with exhaust gas pressure protective control (for example, a function representing an IGV opening schedule as illustrated in FIG. 14) has been set in a function generator 63. Based on this function representing the IGV opening schedule, the opening of the IGV 6, which corresponds to the intake air temperature-corrected power generator output obtained in the multiplier 62, is determined, and set as an advance IGV opening. Then, unless feedback correction is made in an adder 64, the advance IGV opening set in the function generator 63 is outputted to the higher value selector 24 (FIG. 2) as the IGV opening C for exhaust gas pressure protective control.

If an exhaust gas pressure P3 is provided, as feedback, from the exhaust gas pressure detector 16, a subtracter (deviation computing unit) 65 computes a pressure deviation (P4-P3) between the exhaust gas pressure P3 and an exhaust gas pressure setting (upper limit setting) P4 set by an exhaust gas pressure setter (not shown).

If, as a result, the exhaust gas pressure P3 exceeds the exhaust gas pressure setting P4 to render the pressure deviation negative, proportional plus integral computation based on this pressure deviation is performed by a PI (proportion plus integral) controller 66 to obtain a negative correction value for the advance IGV opening. At this time, the negative correction value is added in the adder 64 to the advance IGV opening outputted from the function generator 63 (namely, the correction value is subtracted from the advance IGV opening) to make feedback correction of the advance IGV opening setting. This corrected advance IGV opening is outputted to the higher value selector 24 (FIG. 2) as the IGV opening C for exhaust gas pressure protective control. The feedback correction amount for the advance IGV opening setting in this exhaust gas pressure protective control is to be in a correction range only on the negative side (namely, only on the side where the opening of the IGV 6 is decreased), and no feedback correction is to be made on the side where the opening of the IGV 6 is rendered greater than the advance IGV opening.

According to the IGV control device 8 of the gas turbine of the present Embodiment 1, as described above, the IGV opening command D is set based on the IGV opening A set by the exhaust gas temperature control section 21 such that the exhaust gas temperature does not exceed the limit value, the IGV opening B set by the compressor surge protective control section 22 such that the pressure ratio of the compressor 4 does not exceed the surge pressure ratio of the compressor 4 (i.e., surge line), and the IGV opening C set by the exhaust gas pressure protective control section 23 such that the exhaust gas pressure does not exceed the limit value. Thus, IGV opening control can be effected, with the exhaust gas temperature, the pressure ratio of the compressor, and the exhaust gas pressure being taken into consideration. Hence, the continued operation of the gas turbine (increased rate of operation) can be ensured, with the possibility being diminished that the protective function, such as emergency shutdown, is performed.

According to the IGV control device 8 of the gas turbine of the present Embodiment 1, in particular, the value of the IGV opening A or the value of the IGV opening B, whichever is higher, is selected; this selected higher value or the value of the IGV opening C, whichever is lower, is selected; and this selected lower value is set as the IGV opening command D. By so doing, IGV opening control with priority placed on the avoidance of a gas turbine back pressure rise can be effected. Hence, the emergency shutdown of the gas turbine 1 due to an exhaust gas pressure rise (gas turbine back pressure rise) can be prevented more reliably to ensure the continued operation of the gas turbine 1 (increased rate of operation).

The configurations of the first inlet guide vane opening setting means, the second inlet guide vane opening setting means, and the third inlet guide vane opening setting means are not necessarily limited to the exhaust gas temperature control section 21, the compressor surge protective control section 22, and the exhaust gas pressure protective control section 23. The first inlet guide vane opening setting means may be one setting the first inlet guide vane opening with which the temperature of the exhaust gas discharged from the gas turbine body does not exceed the limit value. The second inlet guide vane opening setting means may be one setting the second inlet guide vane opening with which the pressure ratio of the compressor does not exceed the surge pressure ratio of the compressor. The third inlet guide vane opening setting means may be one setting the third inlet guide vane opening with which the pressure of the exhaust gas discharged from the gas turbine body does not exceed the limit value.

Embodiment 2

Figure 15:
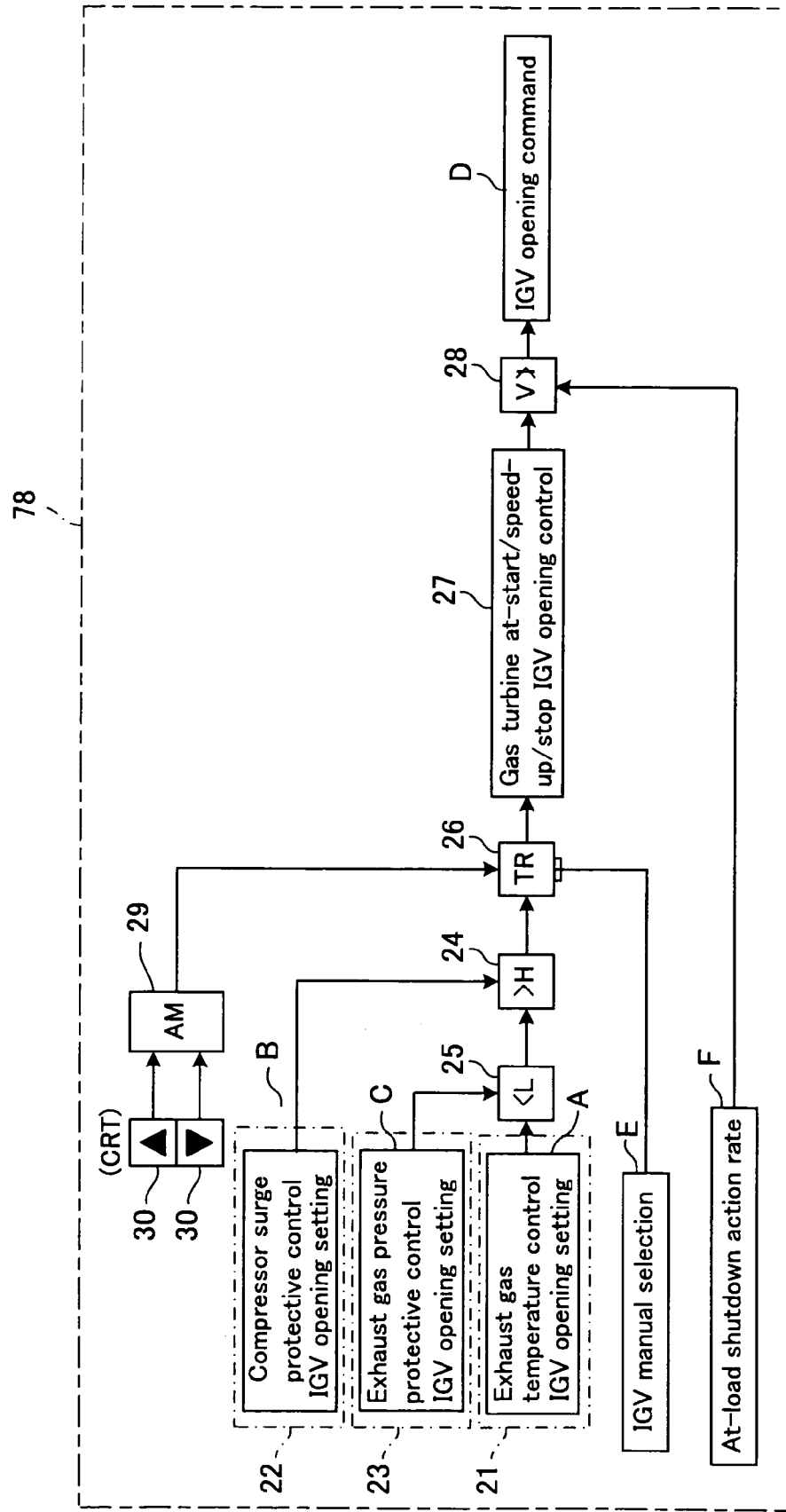
FIG. 15 is a block diagram showing the entire configuration of an IGV control device of a gas turbine according to Embodiment 2 of the present invention.

FIG. 15 is a block diagram showing the entire configuration of an IGV control device of a gas turbine according to Embodiment 2 of the present invention. In FIG. 15, the same portions as those in FIG. 2 are assigned the same numerals and symbols as those in FIG. 2. The IGV control device 8 of a gas turbine according to the aforementioned Embodiment 1 is in the "gas turbine back pressure rise avoidance priority mode". On the other hand, an IGV control device 78 of a gas turbine according to the present Embodiment 2 is in a "compressor surge avoidance priority mode". This feature will be described hereinbelow, but other features are the same as those in the aforementioned Embodiment 1, and their explanations will be omitted herein (see FIGS. 1 to 5).

As shown in FIG. 15, the IGV control device 78 of the present Embodiment 2 has an exhaust gas temperature control section 21 as a first inlet guide vane opening setting means, a compressor surge protective control section 22 as a second inlet guide vane opening setting means, and an exhaust gas pressure protective control section 23 as a third inlet guide vane opening setting means.

In the IGV control device 78, an inlet guide vane opening command D, which places priority on compressor surge avoidance, is set based on an IGV opening A as a first inlet guide vane opening set by the exhaust gas temperature control section 21 such that the temperature of the exhaust gas discharged from the gas turbine body 2 does not exceed the limit value, an IGV opening B as a second inlet guide vane opening set by the compressor surge protective control section 22 such that the pressure ratio of the compressor 4 (the pressure ratio between the inlet intake air pressure and the outlet intake air pressure of the compressor 4) does not exceed the surge pressure ratio of the compressor 4 (i.e., surge line), and an IGV opening C as a third inlet guide vane opening set by the exhaust gas pressure protective control section 23 such that the pressure of the exhaust gas discharged from the gas turbine body 2 does not exceed the limit value. Under this inlet guide vane opening command D, the opening control of the IGV 6 (driving control of an actuator 7) is performed.

Concretely, the value of the IGV opening A set by the exhaust gas temperature control section 21, or the value of the IGV opening C set by the exhaust gas pressure protective control section 23, whichever is lower (i.e., the smaller opening), is selected in a lower value selector 25. Then, the lower selected value in the lower value selector 25 (i.e., the IGV opening A or the IGV opening C), or the value of the second inlet guide vane opening B set by the compressor surge protective control section 22, whichever is higher (i.e., the greater opening), is selected in a higher value selector 24, and outputted to a switcher 26. This higher selected value in the higher value selector 24 (the IGV opening A, the IGV opening B, or the IGV opening C) is taken as the inlet guide vane opening command D. That is, the IGV control device 78 is in the "compressor surge avoidance priority mode" in which top priority is placed on the IGV opening B for compressor surge protective control.

According to the IGV control device 78 of the gas turbine of the present Embodiment 2, as described above, the IGV opening command D is set based on the IGV opening A set by the exhaust gas temperature control section 21 such that the exhaust gas temperature does not exceed the limit value, the IGV opening B set by the compressor surge protective control section 22 such that the pressure ratio of the compressor 4 does not exceed the surge pressure ratio of the compressor 4 (i.e., surge line), and the IGV opening C set by the exhaust gas pressure protective control section 23 such that the exhaust gas pressure does not exceed the limit value. Thus, IGV opening control can be effected, with the exhaust gas temperature, the pressure ratio of the compressor, and the exhaust gas pressure being taken into consideration. Hence, the continued operation of the gas turbine (increased rate of operation) can be ensured, with the possibility being diminished that the protective function, such as emergency shutdown, is performed.

According to the IGV control device 78 of the gas turbine of the present Embodiment 2, in particular, the value of the IGV opening A or the value of the IGV opening C, whichever is lower, is selected; this selected lower value or the value of the IGV opening B, whichever is higher, is selected; and this selected higher value is set as the IGV opening command D. By so doing, IGV opening control with priority placed on the avoidance of compressor surge can be effected. Hence, compressor surge can be avoided more reliably.

Embodiment 3

Figure 16:
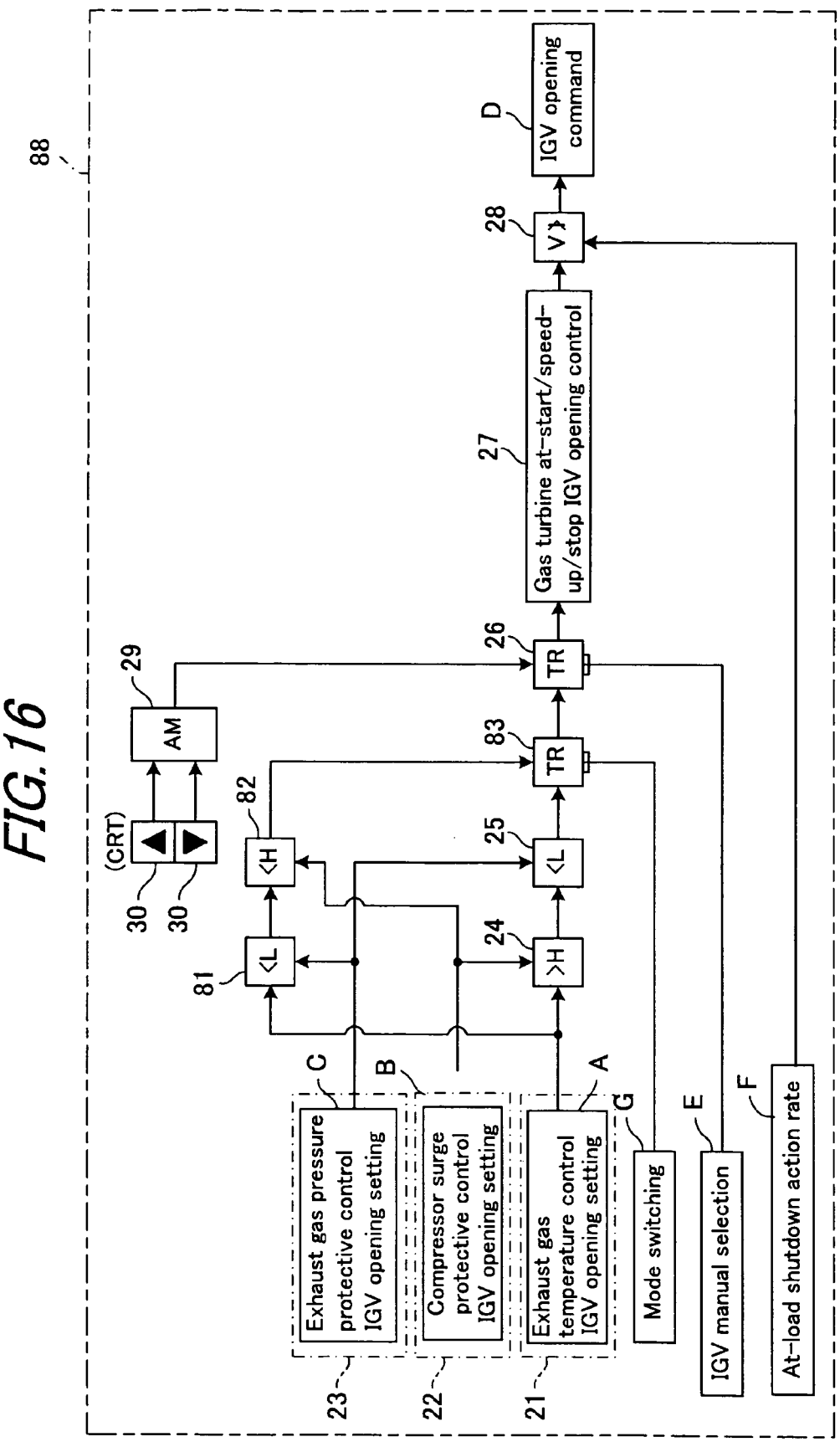
FIG. 16 is a block diagram showing the entire configuration of an IGV control device of a gas turbine according to Embodiment 3 of the present invention.

FIG. 16 is a block diagram showing the entire configuration of an IGV control device of a gas turbine according to Embodiment 3 of the present invention. In FIG. 16, the same portions as those in FIGS. 2 and 15 are assigned the same numerals and symbols as those in FIGS. 2 and 15. The IGV control device 8 of a gas turbine according to the aforementioned Embodiment 1 is in the "gas turbine back pressure rise avoidance priority mode". The IGV control device 78 of a gas turbine according to the aforementioned Embodiment 2 is in the "compressor surge avoidance priority mode". On the other hand, an IGV control device 88 of a gas turbine according to the present Embodiment 3 is configured to switch between the "gas turbine back pressure rise avoidance priority mode" and the "compressor surge avoidance priority mode". This feature will be described hereinbelow, but other features are the same as those in the aforementioned Embodiments 1 and 2, and their explanations will be omitted herein (see FIGS. 1 to 5 and 15).

As shown in FIG. 16, the IGV control device 88 of the present Embodiment 3 has an exhaust gas temperature control section 21 as a first inlet guide vane opening setting means, a compressor surge protective control section 22 as a second inlet guide vane opening setting means, and an exhaust gas pressure protective control section 23 as a third inlet guide vane opening setting means.

In the IGV control device 88, an inlet guide vane opening command D, which places priority on gas turbine back pressure rise avoidance or compressor surge avoidance, is set based on an IGV opening A as a first inlet guide vane opening set by the exhaust gas temperature control section 21 such that the temperature of the exhaust gas discharged from the gas turbine body 2 does not exceed the limit value, an IGV opening B as a second inlet guide vane opening set by the compressor surge protective control section 22 such that the pressure ratio of the compressor 4 (the pressure ratio between the inlet intake air pressure and the outlet intake air pressure of the compressor 4) does not exceed the surge pressure ratio of the compressor 4 (i.e., surge line), and an IGV opening C as a third inlet guide vane opening set by the exhaust gas pressure protective control section 23 such that the pressure of the exhaust gas discharged from the gas turbine body 2 does not exceed the limit value. Under this inlet guide vane opening command D, the opening control of the IGV 6 (driving control of the actuator 7) is performed.

Concretely, in the case of the "gas turbine back pressure rise avoidance priority mode", the value of the IGV opening A set by the exhaust gas temperature control section 21, or the value of the second inlet guide vane opening B set by the compressor surge protective control section 22, whichever is higher (i.e., the greater opening), is selected in a higher value selector 24. Then, the higher selected value in the higher value selector 24 (i.e., the IGV opening A or the IGV opening B), or the value of the IGV opening C set by the exhaust gas pressure protective control section 23, whichever is lower (i.e., the smaller opening), is selected in a lower value selector 25. This lower selected value in the lower value selector 25 (the IGV opening A, the IGV opening B, or the IGV opening C) is taken as the inlet guide vane opening command D. That is, the IGV control device 88 is in the "gas turbine back pressure rise avoidance priority mode" in which top priority is placed on the IGV opening C for exhaust gas pressure protective control.

In the "compressor surge avoidance priority mode", on the other hand, the value of the IGV opening A set by the exhaust gas temperature control section 21, or the value of the IGV opening C set by the exhaust gas pressure protective control section 23, whichever is lower (i.e., the smaller opening), is selected in a lower value selector 81. Then, the lower selected value in the lower value selector 81 (i.e., the IGV opening A or the IGV opening C), or the value of the second inlet guide vane opening B set by the compressor surge protective control section 22, whichever is higher (i.e., the greater opening), is selected in a higher value selector 82. This higher selected value in the higher value selector 82 (the IGV opening A, the IGV opening B, or the IGV opening C) is taken as the inlet guide vane opening command D. That is, the IGV control device 88 is in the "compressor surge avoidance priority mode" in which top priority is placed on the IGV opening B for compressor surge protective control.

Upon receipt of a mode switching signal G from a mode switcher (not shown), a switcher 83 as a mode switching means switches an output signal to a switcher 26 (i.e., an output signal for setting the IGV opening command D) either from the output signal of the lower value selector 25 (the IGV opening A, the IGV opening B, or the IGV opening C selected in the lower value selector 25) to the output signal of the higher value selector 82 (the IGV opening A, the IGV opening B, or the IGV opening C selected in the higher value selector 82), or from the output signal of the higher value selector 82 to the output signal of the lower value selector 25. In other words, the switcher 83 switches either from the "gas turbine back pressure rise avoidance priority mode" to the "compressor surge avoidance priority mode", or from the "compressor surge avoidance priority mode" to the "gas turbine back pressure rise avoidance priority mode", based on the mode switching signal G. The mode switcher is of a manual type which outputs the mode switching signal G when operated by an operator. However, this is not restrictive, and it may be one which automatically outputs the mode switching signal G under predetermined conditions.

According to the IGV control device 88 of the gas turbine of the present Embodiment 3, as described above, the IGV opening command D is set based on the IGV opening A set by the exhaust gas temperature control section 21 such that the exhaust gas temperature does not exceed the limit value, the IGV opening B set by the compressor surge protective control section 22 such that the pressure ratio of the compressor 4 does not exceed the surge pressure ratio of the compressor 4 (i.e., surge line), and the IGV opening C set by the exhaust gas pressure protective control section 23 such that the exhaust gas pressure does not exceed the limit value. Thus, IGV opening control can be effected, with the exhaust gas temperature, the pressure ratio of the compressor, and the exhaust gas pressure being taken into consideration. Hence, the continued operation of the gas turbine (increased rate of operation) can be ensured, with the possibility being diminished that the protective function, such as emergency shutdown, is performed.

The IGV control device 88 of the gas turbine of the present Embodiment 3, in particular, is furnished with the switcher 83 for switching between the "gas turbine back pressure rise avoidance priority mode" in which the value of the IGV opening A or the value of the IGV opening B, whichever is higher, is selected; this selected higher value or the value of the IGV opening C, whichever is lower, is selected; and this selected lower value is set as the IGV opening command D, and the "compressor surge avoidance priority mode" in which the value of the IGV opening A or the value of the IGV opening C, whichever is lower, is selected; this selected lower value or the value of the IGV opening B, whichever is higher, is selected; and this selected higher value is set as the IGV opening command D. Thus, IGV opening control placing priority on gas turbine back pressure rise avoidance, or IGV opening control placing priority on compressor surge avoidance can be arbitrarily selected according to the operating status of the gas turbine 1.

The present invention, which relates to the IGV control device of a gas turbine, is useful when applied in performing more appropriate IGV opening control, for example, from the viewpoint of continued operation or instrument protection of the gas turbine.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An inlet guide vane control device of a gas turbine, which is installed in the gas turbine including a gas turbine body, a combustor, and a compressor with an inlet guide vane, and which exercises opening control of the inlet guide vane, wherein an inlet guide vane opening command is set based on a first inlet guide vane opening set by first inlet guide vane opening setting means such that a temperature of an exhaust gas discharged from the gas turbine body does not exceed a limit value, a second inlet guide vane opening set by second inlet guide vane opening setting means such that a pressure ratio of the compressor does not exceed a surge pressure ratio of the compressor, and a third inlet guide vane opening set by third inlet guide vane opening setting means such that a pressure of the exhaust gas discharged from the gas turbine body does not exceed a limit value.

2. The inlet guide vane control device of a gas turbine according to claim 1, wherein a value of the first inlet guide vane opening or a value of the second inlet guide vane opening, whichever is higher, is selected, the selected higher value or a value of the third inlet guide vane opening, whichever is lower, is selected, and the selected lower value is set as the inlet guide vane opening command.

3. The inlet guide vane control device of a gas turbine according to claim 1, wherein a value of the first inlet guide vane opening or a value of the third inlet guide vane opening, whichever is lower, is selected, the selected lower value or a value of the second inlet guide vane opening, whichever is higher, is selected, and the selected higher value is set as the inlet guide vane opening command.

4. The inlet guide vane control device of a gas turbine according to claim 1, further comprising mode switching means for switching between a gas turbine back pressure rise avoidance priority mode in which a value of the first inlet guide vane opening or a value of the second inlet guide vane opening, whichever is higher, is selected, the selected higher value or a value of the third inlet guide vane opening, whichever is lower, is selected, and the selected lower value is set as the inlet guide vane opening command, and a compressor surge avoidance priority mode in which a value of the first inlet guide vane opening or a value of the third inlet guide vane opening, whichever is lower, is selected, the selected lower value or a value of the second inlet guide vane opening, whichever is higher, is selected, and the selected higher value is set as the inlet guide vane opening command.

* * * * *